BEST AVAILABLE COPY

No. 11,910. Reissued May 28, 1901.

W. H. JOHNSON & S. D. FRY.

RAILROAD CROSSING.

(Application filed May 12, 1897.)

3 Sheets—Sheet 1.

WITNESSES:

H. D. Neely.

F. A. Fahle

INVENTORS,

William H. Johnson

Stephen D. Fry

H. T. Hendricks

ATTORNEYS

THE NORRIS PETERS CO., PHOTO-LITHO., WASHINGTON, D. C.

No. 11,910. Reissued May 28, 1901.

W. H. JOHNSON & S. D. FRY.

RAILROAD CROSSING.

(Application filed May 12, 1897.)

3 Sheets—Sheet 2.

WITNESSES:

H. W. Neale

F. A. Fahle

INVENTORS

William H. Johnson

Stephen D. Fry

BY

H. T. Goodwin

ATTORNEYS.

THE NORRIS PETERS CO., PHOTO-LITHO., WASHINGTON, D. C.

No. 11,910. Reissued May 28, 1901.

W. H. JOHNSON & S. D. FRY.

RAILROAD CROSSING.

(Application filed May 12, 1897.)

3 Sheets—Sheet 3.

WITNESSES:

H. D. Neale.

F. A. Fahle

INVENTORS

William H. Johnson

Stephen D. Fry.

BY

H. T. Newton

ATTORNEYS

THE NORRIS PETERS CO., PHOTO-LITHO., WASHINGTON, D. C.

UNITED STATES PATENT OFFICE.

WILLIAM H. JOHNSON, OF VEEDERSBURG, AND STEPHEN D. FRY, OF ATTICA, INDIANA; SAID FRY ASSIGNOR OF HIS RIGHT TO SAID JOHNSON AND GOLDSMITH GOODWIN, OF VEEDERSBURG, INDIANA, AND COLUMBUS MARSHALL, OF NORTH ANSON, MAINE.

RAILROAD-CROSSING.

SPECIFICATION forming part of Reissued Letters Patent No. 11,910, dated May 28, 1901.

Original No. 555,449, dated February 25, 1896. Application for reissue filed May 12, 1897. Serial No. 636,230.

*To all whom it may concern:*

Be it known that we, WILLIAM H. JOHNSON, residing at Veedersburg, and STEPHEN D. FRY, residing at Attica, in the county of Fountain and State of Indiana, citizens of the United States, have invented a new and useful Railroad-Crossing, of which the following is a specification.

Our invention relates to improvements in railroad-crossings; and it consists of the combination, with the rails of crossing tracks, of sections, carrying a pair of rail-sections, pivotally mounted at each intersection of the lines of the crossing rails, and means connecting said pivoted sections whereby they may be operated together to make the rails of either of the crossing tracks complete and continuous.

Our invention further consists of an arrangement of parts in which the rails of the crossing tracks will not meet at any point and in which the gaps left in said rails may be completely filled by the movable rail-sections, thereby furnishing means for forming complete and continuous rails for either of the crossing tracks by swinging the rail-sections into position, at the same time doing away with all "overtread."

Our invention also consists in certain other novel constructions, combinations, and arrangements of parts, all of which will be hereinafter more particularly set forth and claimed.

The accompanying drawings illustrate our invention.

Figure 1:
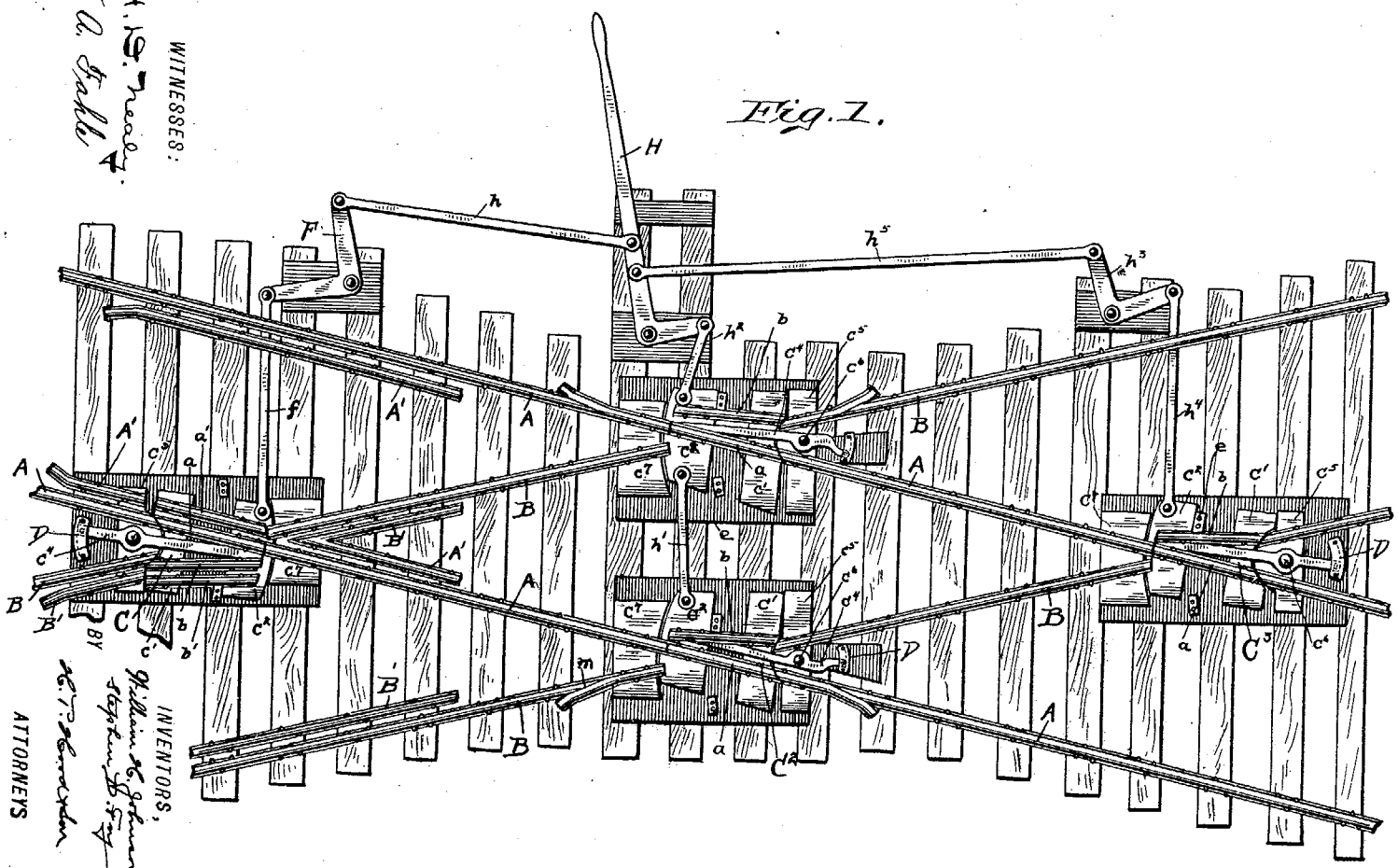
Figure 2:
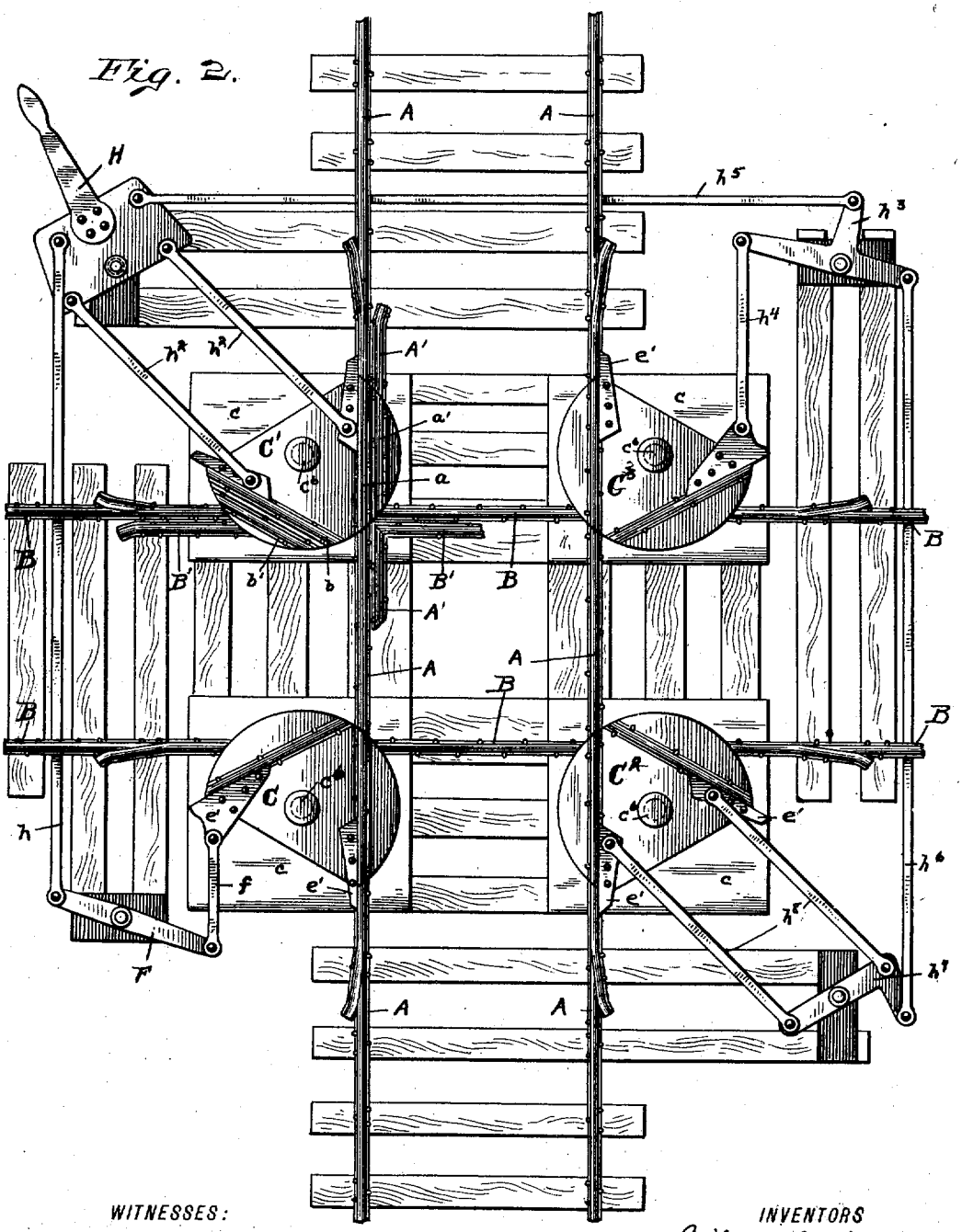
Figure 3:
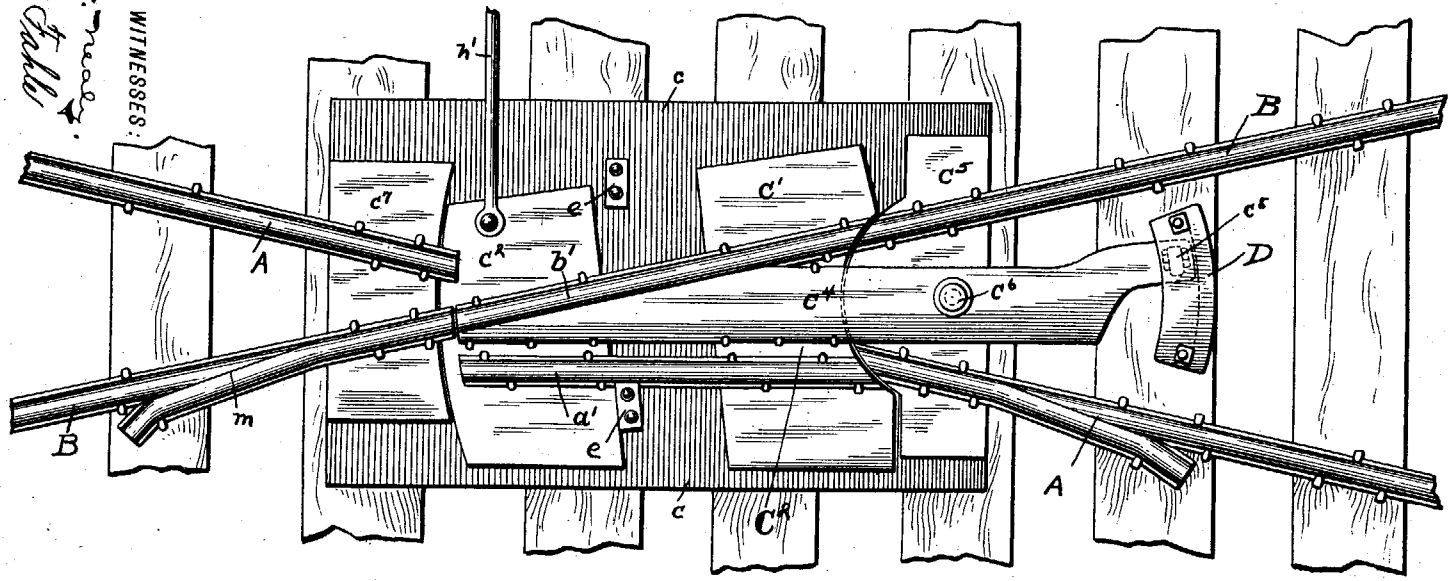
Figure 4:
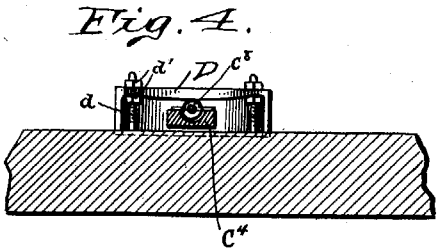

Figure 1 is a plan view of our invention as applied to a crossing in which the tracks cross diagonally. Fig. 2 is a plan in which the tracks cross at a right angle. Fig. 3 is an enlarged detail plan of one of the pivoted sections and the coöperating parts. Fig. 4 is a detail vertical section through the supporting-arm forming a part of one of the pivoted sections.

In the drawings, A A represent the main rails of one track, and B B the main rails of the other track. Guard-rails A′ A′ and B′ B′ may be provided, if desired; but it is to be understood that said guard-rails are merely precautionary and are not at all essential to the proper operation of our crossing. At the points of intersection of the lines of the main rails a gap is left in each of said rails, and mounted at said points of intersection are pivoted sections C C′ $C^2$ $C^3$, each carrying a pair of rail-sections *a* and *b*. If guard-rails are used, it is also desirable that guard-rail sections be provided, and in such case, guard-rail sections *a′* and *b′* are secured to each pivoted section. The main rails and the guard-rails when used are of the usual form and are secured to the ties in any well-known manner. Each of the pivoted sections is composed of the plates $c'$ and $c^2$, to which are secured the rail-sections *a* and *b* and the guard-rail sections when used and to which is also secured an arm or lever $c^4$. Each section thus formed is mounted upon a base-plate *c*, and arm $c^4$ is pivoted at $c^6$ to a plate $c^5$, the said plate being secured to the base-plate *c*. Pivot $c^6$ is placed between the approaching ends of rails A and B, a short distance away from the ends thereof, and the edge of plate $c^5$ and the ends of the rails are cut upon a line forming an arc of a circle struck from said pivot, and the adjacent edge of plate $c'$ is provided with a segmental recess adapted to receive the segmental portion of plate $c^5$. The ends of the rails A A B B are suitably secured to plates $c^5$ and $c^7$, carried by the base-plate *c*, the said ends approaching each other, but being separated a short distance. By this complete separation of the main rails the rails of one track do not at any point come into engagement with or meet the rails of the crossing track, thus eliminating all overtread—*i. e.*, there is no portion of either rail of either track which may be engaged by the wheels of a train passing over the other track. This is an important feature, which prevents all "hammering," and is produced by the removal of those portions of each rail which would, if allowed to remain, come into engagement with one of the rails of the crossing track. The ends of the rails A and B and of the rail-sections *a* and *b* are all cut upon lines substantially concentric with the pivot $c^6$, so that when either rail-section is moved into position to aline with the coöperating main rail the gap therein is completely filled, the joints being closed by the movement of the rail-section around the pivot of the pivoted section, thus producing a continuous and complete rail in which there are no gaps.

The outer end of plate $c^2$ and the adjacent edge of plate $c^7$ are cut upon a line substantially concentric with pivot $c^6$. In order to prevent an upward movement of the outer end of the pivoted section, the ends of rails A and B, which are secured to plate $c^7$, are extended slightly beyond said plate, and the outer end of plate $c^2$ is caused to lie thereunder.

The end of each arm $c^4$ may be provided with an antifriction-roller $c^8$, journaled in suitable boxes, and this roller engages the convex cam or flanged plate D. The cam D is of such shape as to cause the pivoted section as it passes from one extreme position to the other to rise from the base-plate $c$, and as the said section reaches either of its extreme positions, bringing one or the other of the rail-sections into alinement with its respective main rail, it is brought into engagement with and rests solidly upon the base-plate. By this means the pivoted sections are firmly supported when in position to allow the passage of a train, but may be easily shifted from one position to the other. Cam D may be made vertically adjustable by bolts and nuts $d$ $d'$, respectively. By this means any wear or sagging of the parts may be taken up.

Suitable stops $e$ are mounted on the base-plates to limit the movement of the pivoted sections, so that the rail-sections will lie exactly in line with the corresponding main rails when the sections come into engagement with said stops. The pivoted sections may be operated simultaneously by any suitable means. In the drawings this means is shown as consisting of an operating-lever H, to one arm of which section C′ is connected by means of a link $h^2$. Pivoted near section C is a bell-crank lever F, to one arm of which section C is connected by means of a link $f$, and to the other arm of which is secured one end of a link $h$, the other end of which is secured to lever H. Section $C^3$ is connected to lever H by a similar system consisting of lever $h^3$ and links $h^4$ and $h^5$. Section $C^2$ is connected to section C′ by means of a link $h'$.

We provide for the expansion of the main rails by means of the bevel-joints $m$ in the usual well-known manner.

The construction shown in Fig. 2 is substantially the same as that shown in the other figures, with the exception of slight modifications allowed by the different angles between the crossing tracks. In this construction each of the pivoted sections may be circular in form concentric with the pivot $c^6$, and these sections fit snugly against the ends of the main rails, which are cut away on the same curvature as the peripheries of the sections. In this construction the pivot-point is so located with relation to the section that the said section is almost balanced about the pivot. Any suitable antifriction means may be provided for each section, if desired.

The pivoted sections in the construction shown in Fig. 2 are connected with an operating-lever H in the same manner as in the construction shown in Fig. 1, the only difference being that section $C^2$ instead of being connected with C′ is connected with the lever H by means of link $h^5$, lever $h^3$, link $h^6$, lever $h^7$, and links $h^8$. Stops $e'$ may be secured to the pivoted sections in position to engage the main rails or any other stationary part, if desired.

There are several points to be noticed in the above-described improvement: First, the arrangement and construction of the pivoted section are such that it may be applied to a crossing of any angle; second, there is no overtread at any point in the crossing, and, third, the swinging movement of the rail-sections is such that the gap in the main rails is completely filled, the said movement of the rail-sections into line with the main rails closing the joints, and thus producing a complete and continuous rail across the crossing.

We claim as our invention—

1. The combination with the main and guard rails of the respective tracks, of sections carrying pairs of connecting main and guard rails and pivotally mounted at the intersections of the rails, and means connecting said sections whereby they are operated simultaneously to make either the rails of one or other of the tracks complete, substantially as described.

2. The combination with the main and guard rails of the respective tracks, of sections carrying pairs of connecting main and guard rails and pivotally mounted at the intersections of the rails, antifriction means for supporting said sections and levers connecting said sections whereby they are operated simultaneously to complete both main and guard rails of one or the other tracks, substantially as described.

3. The combination with the main and guard rails of the respective tracks, of sections carrying pairs of connecting main and guard rails and movably mounted at the intersections of the rails, levers connected to said sections and pivotally mounted, antifriction-rollers on the ends of said levers, flanged plates under which said rollers bear, and levers for moving said sections simultaneously, substantially as described.

4. The combination with the main and guard rails of the respective tracks, of sections carrying pairs of connecting main and guard rails and movably mounted at the intersections of the rails, levers connected to said sections and pivotally mounted, antifriction-rollers on the ends of said levers, flanged plates having convex under sides adapted to engage said rollers, whereby the sections are raised slightly at the middle of their movement, and levers for operating all of said sections, simultaneously, substantially as described.

5. In a railroad-crossing, the combination of pivoted sections placed at the intersections of the main rails of the crossing tracks and each bearing two rail-sections, the pivots of said sections being eccentrically located with relation to the intersecting lines of the main rails and the sections swinging in a plane parallel with the main rails, and means for swinging all of said pivoted sections together so as to bring the rail-sections into line with their respective tracks.

6. In a railroad-crossing, the combination of pivoted sections placed at the intersections of the main rails of crossing tracks and each bearing two rail-sections, the vertical pivots of said tables being eccentrically located with relation to the intersecting lines of the main rails and upon the medial line between the rail-sections, and means for swinging all of said sections together so as to bring the rail-sections into line with their respective tracks.

7. In a railroad-crossing, the combination with the main rails approaching at an angle but not meeting, of a pivoted section placed at the intersection of the lines of the main rails and provided with a pair of rail-sections the said section swinging in a plane parallel with the main rails, each of said rail-sections being so arranged that it may be brought into alinement with the corresponding main rail, the arrangement being such that there is no overtread.

8. In a railroad-crossing, the combination with the main rails approaching at an angle but not meeting, of a horizontally-swinging pivoted section placed at each of the intersections of the lines of the main rails and each provided with a pair of rail-sections, each of said rail-sections being so arranged that it may be brought into alinement with the corresponding main rails, the arrangement being such that there is no overtread.

9. In a railroad-crossing, the combination with the main rails approaching at an angle but not meeting, of a horizontally-swinging pivoted section placed at the intersection of the lines of the main rails, the pivot for said section being placed between the main rails a short distance from the approaching ends thereof, and a pair of rail-sections carried by said pivoted section, the arrangement being such that each of the said rail-sections may be moved into alinement with the corresponding main rail and when moved into such position will form a complete, continuous rail.

10. In a railroad-crossing, the combination with the main rails approaching at an angle but not meeting, of a horizontally-swinging pivoted section placed at each of the intersections of the lines of the main rails, the pivot for said section being placed between the main rails a short distance from the approaching ends thereof, a pair of rail-sections carried by each of said pivoted sections, and means for swinging all of said pivoted sections together so as to bring either rail-section into alinement with its respective main rail, the said rail-sections, when so moved into alinement, forming a complete, continuous rail.

11. In a railroad-crossing, the combination with the main rails, of a pivoted section carrying a pair of connecting rail-sections and mounted at the intersection of the lines of the main rails, an arm carried by said pivoted section, and a cam adapted to engage said arm and thereby raise the pivoted section as it passes through its medial position.

12. In a railroad-crossing, the combination with the main rails, of a pivoted section carrying a pair of connecting rail-sections and mounted at each intersection of the lines of the main rails, an arm carried by each of said pivoted sections, a cam adapted to engage each of said arms and thereby raise the pivoted sections as they pass through their medial positions, and means for swinging all of said pivoted sections together and thereby completing one pair or the other of the main rails.

13. In a railroad-crossing, the combination with the main rails, of a pivoted section carrying a pair of connecting rail-sections and mounted at the intersection of the lines of the main rails, an arm carried by said pivoted section, a roller carried by said arm, and an adjustable cam adapted to engage said roller and thereby raise the pivoted section as it passes through its medial position.

WILLIAM H. JOHNSON.
STEPHEN D. FRY.

Witnesses:
J. P. NUTTING,
J. E. YETTER.